Oct. 2, 1928.
1,686,499
C. G. RICHARDSON
LEDGER BLADE CONSTRUCTION FOR CLOTH SHEARS
Filed Jan. 9, 1924   2 Sheets-Sheet 2
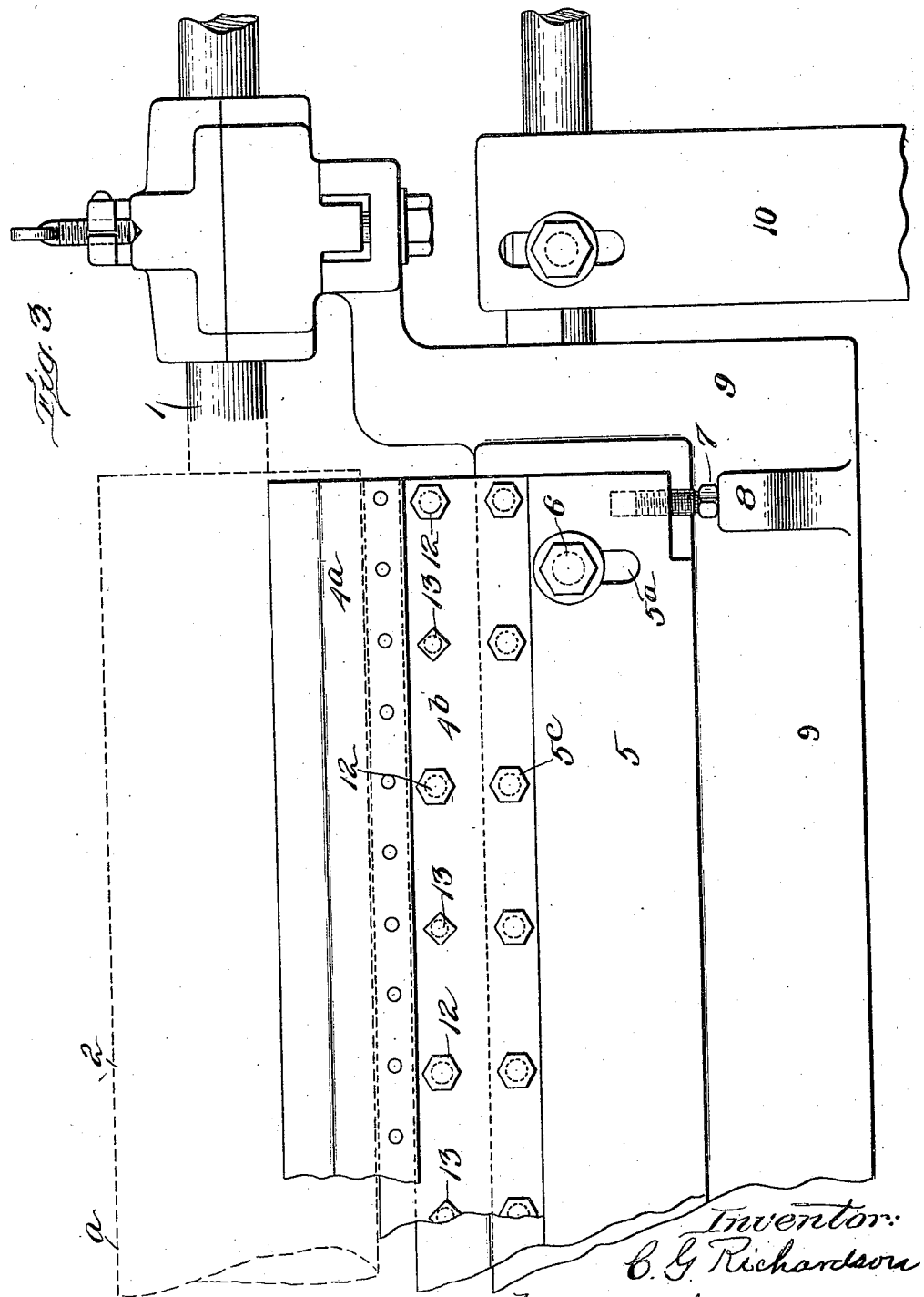

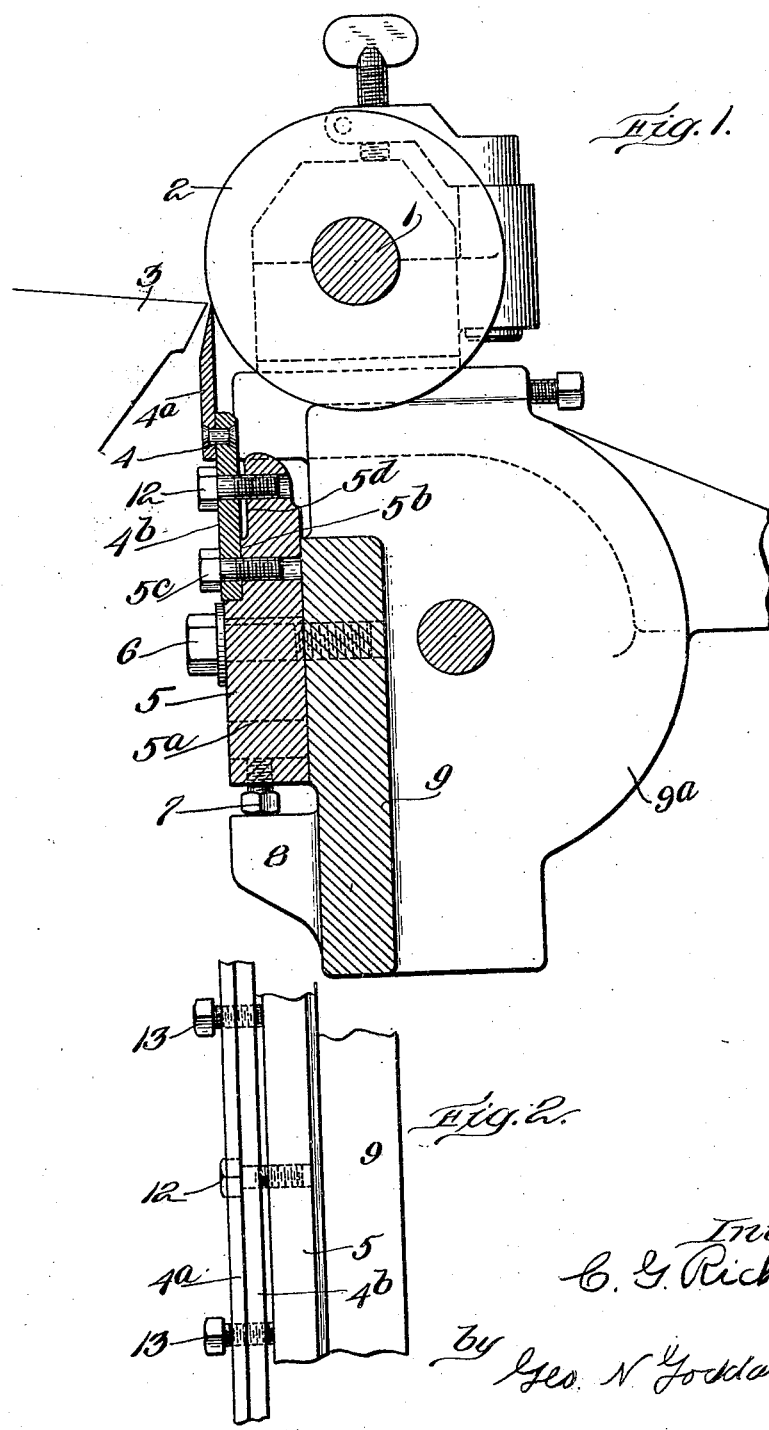

Patented Oct. 2, 1928.

1,686,499

UNITED STATES PATENT OFFICE.

CHARLES G. RICHARDSON, OF SPRINGFIELD, VERMONT, ASSIGNOR TO PARKS & WOOLSON MACHINE COMPANY, OF SPRINGFIELD, VERMONT, A CORPORATION OF VERMONT.

LEDGER-BLADE CONSTRUCTION FOR CLOTH SHEARS.

Application filed January 9, 1924. Serial No. 685,246.

This invention relates to the mounting of ledger blades for cloth shears, and is intended to provide a construction and arrangement affording easy access to the adjusting and fastening members of the ledger blade so as to facilitate quick adjustment by the operator, and also to afford a construction that not only makes easy the setting of the ledger blade in true alignment with its cooperating rotary shear but also allows the ledger blade to be re-adjusted to compensate for wear without disturbing its correct alignment in relation to the rotary shear or fly blade.

With these objects in view my invention comprises, generally speaking, a ledger blade element secured to an adjustable and detachable supporting head by attaching and adjusting screws so arranged as to make possible the springing laterally of different portions of the ledger blade to secure the desired alignment or relationship to the peripheral path of the revolving fly blade. Another feature of the improvement consists in securing a substantially vertical ledger blade element against the front face of the supporting portion of the frame by means of suitable adjusting and attaching bolts that are accessible in front of the shear instead of, as heretofore, arranging the ledger blade in a horizontal or nearly horizontal position with its fastening ends necessarily located to the rear of the shear, at which point they are with difficulty accessible to the operator. Another feature of this invention resides in the construction and arrangement by which, after the ledger blade has been adjusted to proper alignment with the rotary fly blade, it may be set nearer to the fly blade as its edge becomes worn by reason of its attachment to an adjustable supporting head without disturbing the accuracy of its alignment.

These and other features of the invention will be explained in the following specification and will be defined in the claims hereto annexed.

In the accompanying drawings I have illustrated a preferred form of construction and arrangement embodying and illustrating the principles of this invention, in which:

Figure 1 is a vertical section taken transversely of the ledger blade and the fly blade shaft showing the arrangement of ledger blade and its supporting and fastening and adjusting means.

Figure 2 is a detail plan view showing the arrangement of blade aligning screws.

Figure 3 is a front elevation of one end portion of the ledger blade showing the adjusting and attaching means in relation to the path of the revolving fly blade.

In the practice of the invention, according to the form illustrated in the drawings, I employ the usual fly blade 2, mounted on the rotary shaft 1, and a suitable cooperating cloth rest 3, around the edge of which the cloth passes to expose its nap or pile to the action of the revolving fly blade and the stationary ledger blade which acts as the cooperating stationary element of the shearing couple. As the present invention is not concerned with any special construction of fly blade or of cloth rest, the details of these parts are not herein shown as this invention is particularly concerned with the mounting of the ledger blade.

Between the end frames 10 of the machine is mounted a fly-blade frame comprising end members $9^A$ a heavy rigid cross beam or plate 9, whose front face is planed or smoothed so as to receive and support a detachable and adjustable supporting head 5 which is in the form of a long relatively deep and narrow truss or being secured firmly to the bed plate 9 by means of fastening bolts or screws 6 which pass through vertical slots $5^a$, formed in the head so as to permit vertical adjustment of the head. This vertical adjustment is effected by slightly slacking or easing the bolts 6, and then turning the set screws 7, whose heads thrust against the underlying ledges 8, so as to force the head upward by a finely graduated movement.

The front face of the head, as shown at $5^b$ is provided with a planed or smooth front face $5^b$ affording a bearing or supporting surface for the bottom part of the ledger blade element 4. Above this attaching ledge $5^b$, the front face of the head 5, is rearwardly offset to form a narrow interstitial space between the portion of the head and the opposed part of the attached ledger blade element.

The ledger blade element 4 comprises the thin somewhat flexible steel knife blade $4^a$, which is firmly riveted to a somewhat heavier and stiffer backing plate 4ᵇ, which, nevertheless, has sufficient flexibility to allow it to be sprung laterally to secure perfect alignment between the cutting edge of the knife blade 4ᵃ and the circumferential path of the revolving shear element or fly blade, indicated at 2.

Near the lower edge of the backing plate 4ᵇ, there is provided a row of bolt holes through which are passed attaching bolts 5ᶜ, which are tapped into thread holes formed in the supporting head 5 and, therefore, serve to clamp the lower edge portion of the backing plate firmly against the seat 5ᵇ, provided therefor. Somewhat above the row of bolts 5ᶜ there is provided another row of bolt holes extending longitudinally of the backing plate 4ᵇ, and in these bolt holes are inserted in alternation a series of thrust screws 13, and of draft screws 12. The thrust screws, as indicated in Figure 2, have threaded engagement with the backing plate 4ᵇ, while their inner ends abut against the front face or seat 5ᵇ of the adjustable head 5. Consequently the screwing in of these thrust screws 13 tends to spring or buckle outwardly the adjacent portion of the backing plate 4ᵇ. On the other hand, the draft screws 12 pass freely through the smooth holes provided for them in the backing plate and at their inner ends have a tapped or threaded engagement with properly located holes formed in the adjustable head, as indicated in Figures 1 and 2.

It will therefore be seen that with the above arrangement of adjusting screws it is possible to spring, either outwardly or inwardly, different portions of the backing plate sufficiently to obtain a proper alignment of the knife edge element 4ᵃ which is firmly riveted to the backing plate and must follow its longitudinal contour.

With the above described construction it will be seen that after the ledger blade has once been set to true alignment or cooperative relation with the revolving fly blade, it can be readily adjusted to take up wear without in the least disturbing this true alignment by merely slacking the bolts 6 of its adjustable head and turning out the vertical adjusting screws 7 until the head is lifted sufficiently to restore proper shearing relation between the knife edge and the fly blade. As the head 5 is sufficiently rigid and heavy to retain a permanent alignment it will be seen that there is no necessity of re-adjusting the screws 12 and 13, which are not effected by the vertical adjustment of the adjustable head 5. It will also be observed that all the attaching and adjusting screws are accessible from the front of the shear so that the desired adjustments not only can be very readily effected but also can be made by the operator from a position where he can perfectly see and determine the relationship of the ledger blade edge to the revolving shear blades, while making his adjustments, an advantage that makes more easy the perfect adjustment of the ledger blade.

What I claim is:

1. In a cloth shearing machine, the combination with a rotary fly-blade and its supporting frame, of a ledger blade supporting head adjustably secured to said frame to permit its adjustment toward and away from the peripheral path of the fly-blade, a flexible ledger blade element and means for securing the ledger blade element at intervals along its length to said head, said securing means being adjustable to transversely flex different portions of the ledger blade element and thereby properly align the edge of the ledger blade with the peripheral path described by the fly-blade.

2. In a cloth shearing machine, the combination with a rotary fly blade, of a cooperating ledger blade, a series of draft screws securing said ledger blade to a supporting head, a series of thrust screws mounted in said ledger blade and thrusting against said head thereby producing an outward thrust against adjacent portions of the ledger blade and means for adjusting said supporting head to move the ledger blade into shearing position without disturbing the longitudinal alignment of the ledger blade, substantially as described.

3. In a cloth shearing machine, the combination of a rigid bed plate, an adjustable ledger supporting head firmly but detachably secured to said bed, a ledger blade element attached thereto so as to leave a longitudinal interstitial space between the ledger blade element and the head, a series of alternating draft and thrust screws arranged along the line of said interstitial space and adjustable to spring the edge of the ledger blade into true alignment with the cooperating fly blade, substantially as described.

4. In a cloth shearing machine, the combination with a rotary fly blade, of a relatively flexible ledger blade and a rigid head, the ledger blade being secured to said head by means that are adjustable to permit the transverse springing of different portions of the blade to give its edge proper alignment, and means for adjustably securing said head to its own support to effect the edgewise adjustment of the ledger blade toward or from the fly blade, substantially as described.

5. In a cloth shearing machine, the combination of a relatively flexible ledger blade, secured to a rigid supporting head to permit lateral springing of the blade at intervals along its length to properly align its edge for shearing, a fixed bed plate, attaching bolts for securing the head firmly to the bed in different positions of adjustment, and adjusting screws arranged to shift said head in a direction transversely of said attaching bolts, substantially as described.

6. In a cloth shearing machine, the combination with a rotary fly blade, a vertically arranged ledger blade secured to the front face of a vertically adjustable head by attaching means that are accessible from in front of said blade, means for adjustably securing said head to the front of a fixed supporting member to permit vertical adjustment of the head and the ledger blade, said head-securing means being also accessible from the front, substantially as described.

7. In a cloth shearing machine, the combination of a ledger blade arranged in a substantially vertical plane below the level of the fly blade shaft, a vertically adjustable supporting head therefor. a fixed bed, means for adjustably and detachably securing said head to said bed to hold it firmly in different positions of vertical adjustment, means for detachably securing said ledger blade to said head, said means acting also to effect longitudinal alignment of the blade, said securing and adjusting means being arranged to be accessible from in front, whereby the adjustment may be made where the operator can view the shearing line of the ledger blade, substantially as described.

8. In a cloth shearing machine, the combination with a rotary fly blade and its forwardly disposed cloth rest, a vertically disposed ledger blade secured upon a rearwardly disposed vertically adjustable supporting head, said blade being itself deflectible transversely of its plane to effect longitudinal alignment of its edge by deflecting and attaching means engaged with said head, substantially as described.

9. In a cloth shearing machine, the combination with a rotary fly blade, of a ledger blade, adjusting means for laterally warping the edge portions of the ledger blade to secure longitudinal alignment of its edge, and means for adjusting the ledger blade edgewise bodily to and from the fly blade, each set of adjusting means being quite independent of the other whereby either adjustment may be made without disturbing the other, substantially as described.

10. In a cloth shearing machine, the combination with a fly blade, of a ledger blade adjustably secured to a supporting head by holding means capable of effecting a lateral warping of different portions of the blade, said supporting head having plane surface engagement with a supporting bed member and secured thereto by attaching bolts arranged to permit adjustment toward and away from the fly blade, substantially as described.

11. A ledger blade construction for a cloth shearing machine embracing in combination a rigid blade supporting head, a flexible ledger blade element and means comprising a longitudinally arranged series of alternating draft and thrust screws engaging both the head and the blade element and acting when adjusted to flex the blade edge into parallelism with the peripheral path of a cooperating rotary fly-blade.

In witness whereof, I have subscribed the above specification.

CHARLES G. RICHARDSON.